(12) United States Patent
Chaurasia et al.

(10) Patent No.: US 12,341,697 B2
(45) Date of Patent: *Jun. 24, 2025

(54) VIRTUAL PROCESSING UNIT SCHEDULING IN A COMPUTING SYSTEM

(71) Applicant: VMware LLC, Palo Alto, CA (US)

(72) Inventors: Avinash Kumar Chaurasia, Prayagraj (IN); Anshuj Garg, Jabalpur (IN); Uday Pundalik Kurkure, Los Altos, CA (US); Hari Sivaraman, Livermore, CA (US); Lan Vu, Palo Alto, CA (US); Sairam Veeraswamy, Coimbatore (IN)

(73) Assignee: VMware LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/380,218

(22) Filed: Oct. 16, 2023

(65) Prior Publication Data

US 2025/0039093 A1 Jan. 30, 2025

(30) Foreign Application Priority Data

Jul. 25, 2023 (IN) .............................. 202341049988

(51) Int. Cl.
*H04L 47/25* (2022.01)
*G06F 9/455* (2018.01)
(Continued)

(52) U.S. Cl.
CPC .......... *H04L 47/12* (2013.01); *G06F 9/45558* (2013.01); *G06F 9/4881* (2013.01); *H04L 47/25* (2013.01); *G06F 2009/45595* (2013.01)

(58) Field of Classification Search
None
See application file for complete search history.

(56) References Cited

U.S. PATENT DOCUMENTS

| 2005/0063422 | A1* | 3/2005 | Lazar | H04B 3/542 |
| | | | | 709/200 |
| 2014/0146666 | A1* | 5/2014 | Kwan | H04L 47/12 |
| | | | | 370/230 |

(Continued)

FOREIGN PATENT DOCUMENTS

| EP | 1361710 A2 * | 11/2003 | ............. H04L 47/10 |
| EP | 3860049 A1 * | 8/2021 | ............. H04L 43/04 |

(Continued)

OTHER PUBLICATIONS

Chaurasia, A. et al. "Simmer: Rate proportional scheduling to reduce packet drops in vGPU based NF chains," Proceedings of the 51st International Conference on Parallel Processing, Bordeaux, France, Aug. 29, 2022, pp. 1-11.

*Primary Examiner* — Sandarva Khanal
(74) *Attorney, Agent, or Firm* — Kim & Stewart LLP

(57) ABSTRACT

An example computer system includes a hardware platform including a processing unit and software executing on the hardware platform. The software includes a workload and a scheduler, the workload including a network function chain having network functions, the scheduler configured to schedule the network functions for execution on the processing unit. A downstream network function includes a congestion monitor configured to monitor a first receive queue supplying packets to the downstream network function, the congestion monitor configured to compare occupancy of the first receive queue against a queue threshold. An upstream network function including a rate controller configured to receive a notification from the congestion monitor generated in response to the occupancy of the first receive queue exceeding the queue threshold, the rate con- (Continued)

troller configured to modify a rate of packet flow between a second receive queue and the upstream network function in response to the notification.

16 Claims, 7 Drawing Sheets

(51) Int. Cl.
*G06F 9/48* (2006.01)
*H04L 47/12* (2022.01)

(56) References Cited

U.S. PATENT DOCUMENTS

| | | | | |
|---|---|---|---|---|
| 2018/0124800 | A1* | 5/2018 | Arnold | H04W 72/542 |
| 2018/0293701 | A1* | 10/2018 | Appu | G06F 9/5055 |
| 2019/0018699 | A1* | 1/2019 | Asaro | G06F 9/485 |
| 2019/0303203 | A1* | 10/2019 | Guan | G06F 9/5077 |
| 2020/0028787 | A1* | 1/2020 | Mehra | H04L 47/30 |
| 2020/0409732 | A1* | 12/2020 | Kovacevic | G06F 9/30138 |
| 2021/0184988 | A1* | 6/2021 | Anwer | H04L 47/803 |
| 2022/0311711 | A1* | 9/2022 | Jepsen | H04L 47/27 |
| 2023/0198907 | A1* | 6/2023 | Raghavan | H04L 41/046 |
| | | | | 370/235 |

FOREIGN PATENT DOCUMENTS

| | | | | |
|---|---|---|---|---|
| WO | WO-2018197924 | A1 * | 11/2018 | |
| WO | WO-2023073408 | A1 * | 5/2023 | H04W 60/04 |
| WO | WO-2024183932 | A1 * | 9/2024 | H04L 41/147 |

* cited by examiner

VIRTUAL PROCESSING UNIT SCHEDULING IN A COMPUTING SYSTEM

RELATED APPLICATION

Benefit is claimed under 35 U.S.C. 119(a)-(d) to Foreign Application Serial No. 202341049988 filed in India entitled "VIRTUAL PROCESSING UNIT SCHEDULING IN A COMPUTING SYSTEM", on Jul. 25, 2023 by VMware, Inc., which is herein incorporated in its entirety by reference for all purposes.

BACKGROUND

A network infrastructure can include various network functions (NFs) operating together to offer specific network service(s). Multiple of such NFs can process network traffic in a designated order. This arrangement of NFs is referred to herein as a Network Function Chain (NFC) or Service Function Chain (SFC). Traditionally, NFs such as firewalls, Intrusion Detection Systems (IDS) (IDSO, proxies, Network Address Translators (NAT), and the like were deployed using proprietary and special-purpose hardware devices. Such special-purpose hardware devices can deliver adequate performance but have higher deployment costs and can be difficult to configure, manage, and upgrade. Network Function Virtualization (NFV) technology addresses the limitations of special-purpose hardware devices. NFV decouples the NFs from the hardware and transforms the manner NFs are deployed and managed. NFV enables NF deployment over general-purpose commercial off-the-shelf hardware, such as x86 services, ARM® servers, and the like.

With NFV, an NF executes as software on commodity servers instead of on special-purpose hardware. This software-based network function implementation is referred to herein as virtual network functions (VNFs). VNFs offer cost-effectiveness, flexibility, agility, and ease of scalability, such as in a data center environment. Network operators use virtual machines (VMs) and/or containers to deploy VNFs.

Although NFV offers many benefits, one concern is performance. Programmable hardware, such as Graphics Processing Units (GPUs), Field Programmable Gate Arrays (FPGAs), and the like can be used to deploy NFs to improve NFV performance. GPUs, for example, are specialized hardware devices capable of executing millions of threads in parallel. GPUs are now widely used for general-purpose computing applications. Using GPUs in NFV can improve the performance of NFs such as packet routing, Secure Socket Layer (SSL) proxies, and the like. Traditionally a GPU is used to run only a single NF. However, networks often employ NFs working together in an NFC. In configurations with multiple NFs in an NFC, efficient sharing of GPU(s) among NFs is desirable.

SUMMARY

In an embodiment, a computer system includes a hardware platform including a processing unit and software executing on the hardware platform. The software includes a workload and a scheduler. The workload includes a network function chain having network functions. The scheduler is configured to schedule the network functions for execution on the processing unit. A downstream network function of the network functions includes a congestion monitor. The congestion monitor is configured to monitor a first receive queue supplying packets to the downstream network function. The congestion monitor is configured to compare occupancy of the first receive queue against a queue threshold. An upstream network function of the network functions includes a rate controller. The upstream network function supplies packets to the first receive queue. The rate controller is configured to receive a notification from the congestion monitor generated in response to the occupancy of the first receive queue exceeding the queue threshold. The rate controller is configured to modify a rate of packet flow between a second receive queue and the upstream network function in response to the notification.

Further embodiments include a non-transitory computer-readable storage medium comprising instructions that cause a computer system to carry out the above method, as well as a computer system configured to carry out the above method.

DETAILED DESCRIPTION

Figure 1A:
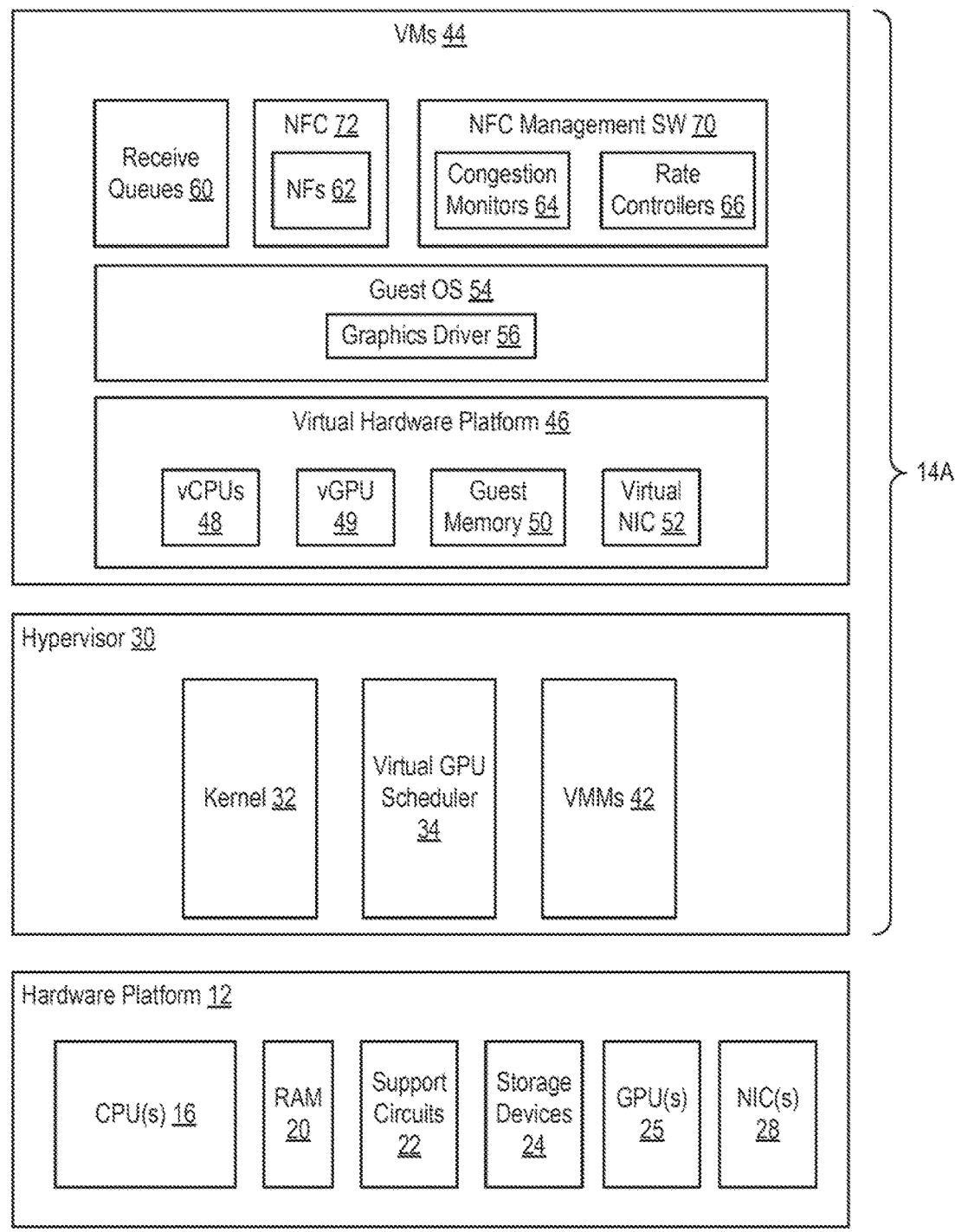
FIG. 1A is a block diagram depicting a host computer system ("host") according to embodiments.

Virtual processing unit scheduling in a computing system is described. In embodiments, a computing system includes a hardware platform and software executing on the hardware platform. The hardware platform includes a processing unit. In embodiments, the processing unit is a peripheral to a central processing unit (CPU) of the hardware platform. For example, the processing unit can be a graphics processing unit (GPU). Another example processing unit is a field programmable gate array (FPGA). In embodiments, the software includes a hypervisor or other virtualization software that virtualizes the hardware platform or operating system execution space for multiple virtual computing instances, such as VMs or containers. The processing unit is "virtualization-aware," i.e., multiple virtual computing instances can share a single processing unit. In the case of hardware virtualization, the hypervisor virtualizes the processing unit to provide virtual processing units (e.g., virtual GPUs) to the virtual computing instances.

A network function chain (NFC) comprises a plurality of workloads executing on the virtual computing instances. For example, each network function (NF) of the NFC can execute in a separate virtual computing instance. In the case of hardware virtualization, each network function executes on a virtual processing unit. The hypervisor includes a scheduler configured to schedule the virtual processing units, and hence the network functions, for execution on the processing unit of the hardware platform. In example implementations, the scheduler does not expose preemption control to external software, i.e., software components outside the scheduler. By "preemption control," it is meant that the scheduling policy can be modified (preempted) by external software. The lack of preemption control prevents external software, including the hypervisor, virtual computing instances, and NFC software, from incorporating custom virtual processing unit scheduling policies. The scheduler may be implemented using a best-effort, a round-robin, a fixed-duration policies, or the like, without preemption control. As explained below, the best-effort policy may take into account load on each VNF in the NFC.

The network functions in the NFC can have heterogenous compute requirements. The scheduling algorithm of the processing unit scheduler does not take into account the compute heterogeneity of the network functions. For example, a round-robin scheduler gives an equal time slot (processing unit share) to each virtual processing unit on which an NF executes. Compute heterogeneity can arise due to differences in the per-packet processing time of the different network functions. In addition, heterogeneity includes a scenario where the NFs of an NFC could be scheduled on either a data processor or CPU depending on the profile of the NFs. An NFC may include NFs that could be executed on CPU or data processor depending on the compute profile. The lower the per-packet processing time, the higher the throughput. Scheduling the NFs on the processing unit without regard to their heterogeneity can result in packet loss. Slower downstream NFs can become bottlenecks to faster upstream NFs. Slower downstream NFs will drop packets already processed by upstream NFs, resulting in wasting work (processing unit cycles) and reducing overall throughput.

Accordingly, NFC management software may be provided that includes a congestion monitor and rate controller for each NF. A congestion monitor tracks occupancy in a receive queue for an NF. If the receive queue occupancy exceeds a queue threshold, the congestion monitor notifies a rate limiter of the upstream NF to apply rate limiting. In such case, the rate limiter will limit the rate of packets supplied by a receive queue to the upstream NF (e.g., suspend the packet flow). Once the congestion condition has abated, the congestion monitor notifies the rate limiter of the upstream NF to resume normal rate. In such case, the rate limiter removes the rate limit from the receive queue, which supplies packets to the upstream NF at the normal rate.

Thus, bottleneck NFs can notify their upstream NFs to limit or suspend packet processing in order to "catch up" and process the packets in their queues. This mitigates or eliminates packet drops at the bottleneck NFs, thereby improving throughput. In some cases, the processing unit scheduler can use the current load (e.g., in terms of queue occupancy) on each NF as meta information when scheduling the virtual processing units for executing (e.g., a best-effort scheduler). In such case, stopping or rate-limiting an upstream NF from processing packets can reduce the processes being scheduled on the processing unit. For a scheduler like a best-effort scheduler, reducing the number of scheduled processes will increase the amount of processing time for the remaining processes (e.g., virtual processing units) and the corresponding NFs still processing packets, further increasing throughput. That is, the remaining processes will have more execution time of the data processor. These and further aspects of the embodiments are described below with respect to the drawings.

FIG. 1A is a block diagram depicting a host computer system ("host") 10 according to embodiments. Host 10 is an example of a host with hardware virtualization software including a VGPU scheduler. Host 10 includes software 14A executing on a hardware platform 12. Hardware platform 12 includes conventional components of a computing device, such as one or more central processing units (CPUs) 16, system memory (e.g., random access memory 20), one or more network interface controllers (NICs) 28, support circuits 22, storage devices 24, and graphics processing units (GPUs) 25. GPU(s) 25 are described in various embodiments herein as example processing units that are virtualization-aware. By virtualization-aware, it is meant that the processing unit can be virtualized into multiple virtual processing units and that a scheduler can schedule processes for executing on each of the virtual processing units (similar to how a hypervisor virtualizes a CPU). Those skilled in the art will appreciate that other types of processing units can be virtualization-aware and can be utilized in the embodiments, such as field programmable gate arrays (FPGAs) and the like.

Each CPU 16 is configured to execute instructions, for example, executable instructions that perform one or more operations described herein, which may be stored in RAM 20. CPU(s) 16 include processors and each processor can be a core or hardware thread in a CPU 16. For example, a CPU 16 can be a microprocessor, with multiple cores and optionally multiple hardware threads for core(s), each having an x86 or ARM® architecture. The system memory is connected to a memory controller in each CPU 16 or in support circuits 22 and comprises volatile memory (e.g., RAM 20). Storage (e.g., each storage device 24) is connected to a peripheral interface in each CPU 16 or in support circuits 22. Storage is persistent (nonvolatile). As used herein, the term memory (as in system memory or RAM 20) is distinct from the term storage (as in a storage device 24).

Each NIC 28 enables host 10 to communicate with other devices through a network (not shown). Support circuits 22 include any of the various circuits that support CPUs, memory, and peripherals, such as circuitry on a mainboard to which CPUs, memory, and peripherals attach, including buses, bridges, cache, power supplies, clock circuits, data registers, and the like. Storage devices 24 include magnetic disks, SSDs, or the like as well as combinations thereof. GPU(s) 25 are peripherals of CPU 16 and may be configured to execute instructions that perform one or more operations described herein.

Software 14A comprises hypervisor 30, which provides a virtualization layer directly executing on hardware platform 12. In an embodiment, there is no intervening software, such as a host operating system (OS), between hypervisor 30 and hardware platform 12. Thus, hypervisor 30 is a Type-1 hypervisor (also known as a "bare-metal" hypervisor). Hypervisor 30 abstracts processor, memory, storage, and network resources of hardware platform 12 to provide a virtual machine execution space within which multiple virtual machines (VM) 44 may be concurrently instantiated and executed.

Hypervisor 30 includes a kernel 32, virtual machine monitors (VMMs) 42, and virtual GPU scheduler 34. Kernel 32 is software that controls access to physical resources of hardware platform 12 among VMs 44 and processes of hypervisor 30. A VMM 42 implements virtualization of the instruction set architecture (ISA) of CPU(s) 16, as well as other hardware devices made available to VMs 44, including virtual NICs, virtual GPUs, and the like. A VMM 42 is a process controlled by kernel 32. Virtual GPU scheduler 34 schedules virtual GPUs for execution on GPU(s) 25. In embodiments, virtual GPU scheduler 34 does not expose preemption control to external software, including hypervisor 30. VMs 44, or guest software executing in VMs. Virtual CPU scheduler 34 can be a best-effort scheduler, round-robin scheduler, fixed-duration scheduler, or the like. While GPU(s) 25 are described as example processing units, hypervisor 30 can include any type of processing unit scheduler that schedules virtual processing units on physical processing units. In embodiments, the processing units are peripherals to CPU 16 (e.g., processing units connected to a peripheral bus of CPU 16). Processing units connected to a peripheral bus of CPU 16 exclude any cores or processors of CPU 16. While the techniques described herein can be used for CPU processors as the processing units, host operating systems, hypervisors, etc. typically include CPU schedulers that allow for preemption control. However, nothing prevents the techniques described herein from being used with CPU processing units.

A VM 44 includes guest software comprising a guest OS 54. Guest OS 54 executes on a virtual hardware platform 46 provided by one or more VMMs 42. Guest OS 54 can be any commodity operating system known in the art. Virtual hardware platform 46 includes virtual CPUs (vCPUs) 48, guest memory 50, virtual NIC 52, and virtual GPU 49. Each vCPU 48 can be a VMM thread. A VMM 42 maintains page tables that map guest memory 50 (sometimes referred to as guest physical memory) to host memory (sometimes referred to as host physical memory). Virtual NIC 52 allows VM 44 to access NIC(s) 28. Virtual GPU 49 allows VM 44 to execute software on GPU(s) 25. Guest OS 54 includes a graphics driver 56 configured to provide an interface between guest software and virtual GPU 49.

The guest software in VMs 44 also includes receive queues 60. NFC 72, and NFC management software 70. NFC 72 includes NFs 62. NFs 62 process packets in sequence between a first NF and a last NF. Each NF 62 between the first and last NFs includes an upstream NF from which packets are received, and a downstream NF to which packets are provided. The first NF receives packets as the input to NFC 72. The last NF provides packets as the output of NFC 72. Receive queues 60 are associated with NFs 62 (e.g., each NF 62 can include a respective receive queue 60). A receive queue 60 receives packets from an upstream NF and provides packets for processing by its respective NF. A receive queue 60 comprises software configured to receive packets, store packets in a queue maintained in memory or storage, retrieve packets from the queue, and provide packets to an NF 62. While receive queues 60 are described as separate software, receive queues 60 can be part of the NFs 62. NFC management software 70 includes congestion monitors 64 and rate controllers 66. Each receive queue 60 includes a pair of congestion monitor 64 and rate controller 66. As described further herein, a congestion monitor 64 monitors occupancy of a receive queue 60 and a rate controller 66 controls the rate of packets output by a receive queue 60. While congestion monitor 64 and rate controller 66 are described as separate software, either or both of congestion monitor 64 and rate controller 66 can be part of an NF 62 and/or part of a receive queue 60 and/or part of a combination of an NF 62 and receive queue 60. Further, each VM 44 includes an NF 62, a receive queue 60, a congestion monitor 64, and a rate controller 66 executing as software therein.

Figure 1B:
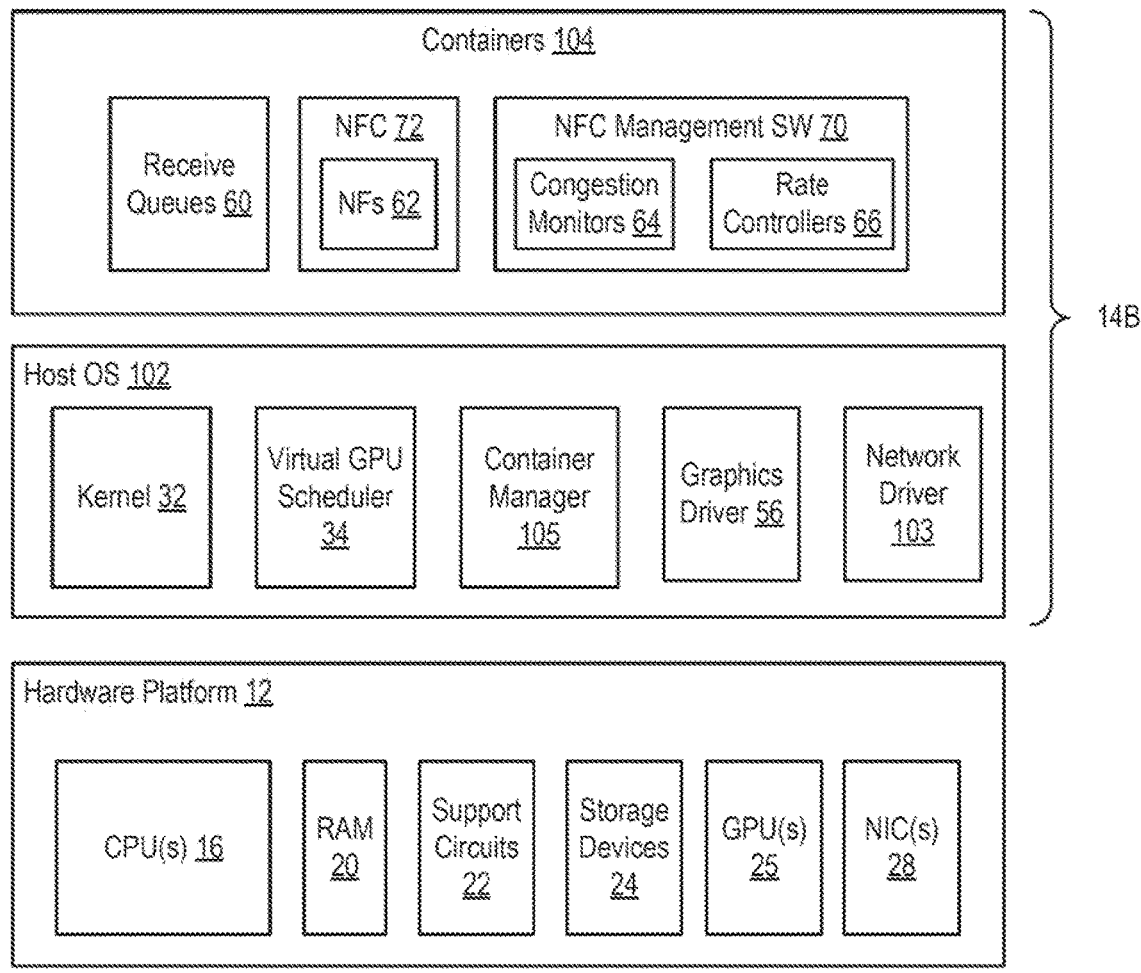
FIG. 1B is a block diagram depicting a host according to embodiments.

FIG. 1B is a block diagram depicting a host 100, which is an example of a non-virtualized host. Host 100 comprises a host OS 102 executing on a hardware platform. The hardware platform in FIG. 1B is identical to hardware platform 12 and thus designated with identical reference numerals. Host OS 102 can be any commodity operating system known in the art. Host OS 102 includes functionality of kernel 32 as shown in FIG. 1A (e.g., excluding virtualization features). Host OS 102 manages processes, rather than virtual machines.

In embodiments, host OS 102 includes a container manager 105. Container manager 105 implements OS-level virtualization using containers 104. Receive queues 60, NFC 72, and NFC management software 70 can execute in containers 104. Host OS 102 includes graphics driver 56 that provides an interface between software and GPUs 25. Host OS 102 includes virtual GPU scheduler 34 to schedule software for execution on GPUs 25 (e.g., schedule NFs 62 for execution on GPU(s) 25). Host OS 102 includes network driver 103 that provides an interface between software and NIC(s) 28.

Containers 104 and VMs 44 are examples of virtual computing instances in which receive queues 60. NFC 72, and NFC management software 70 can execute. FIG. 1A shows the example of VMs 44 managed by a hypervisor and FIG. 1B shows the example of containers 104 managed by a host OS 102. In other examples, containers can execute in VMs 44. That is, the guest software of a VM 44 can include container management software that provides OS-level virtualization of the guest OS in the VM. In such case, NFs 62 can execute in containers that execute in VMs. In other examples, containers can be managed by hypervisor 30 directly without executing in a VM.

Figure 2A:
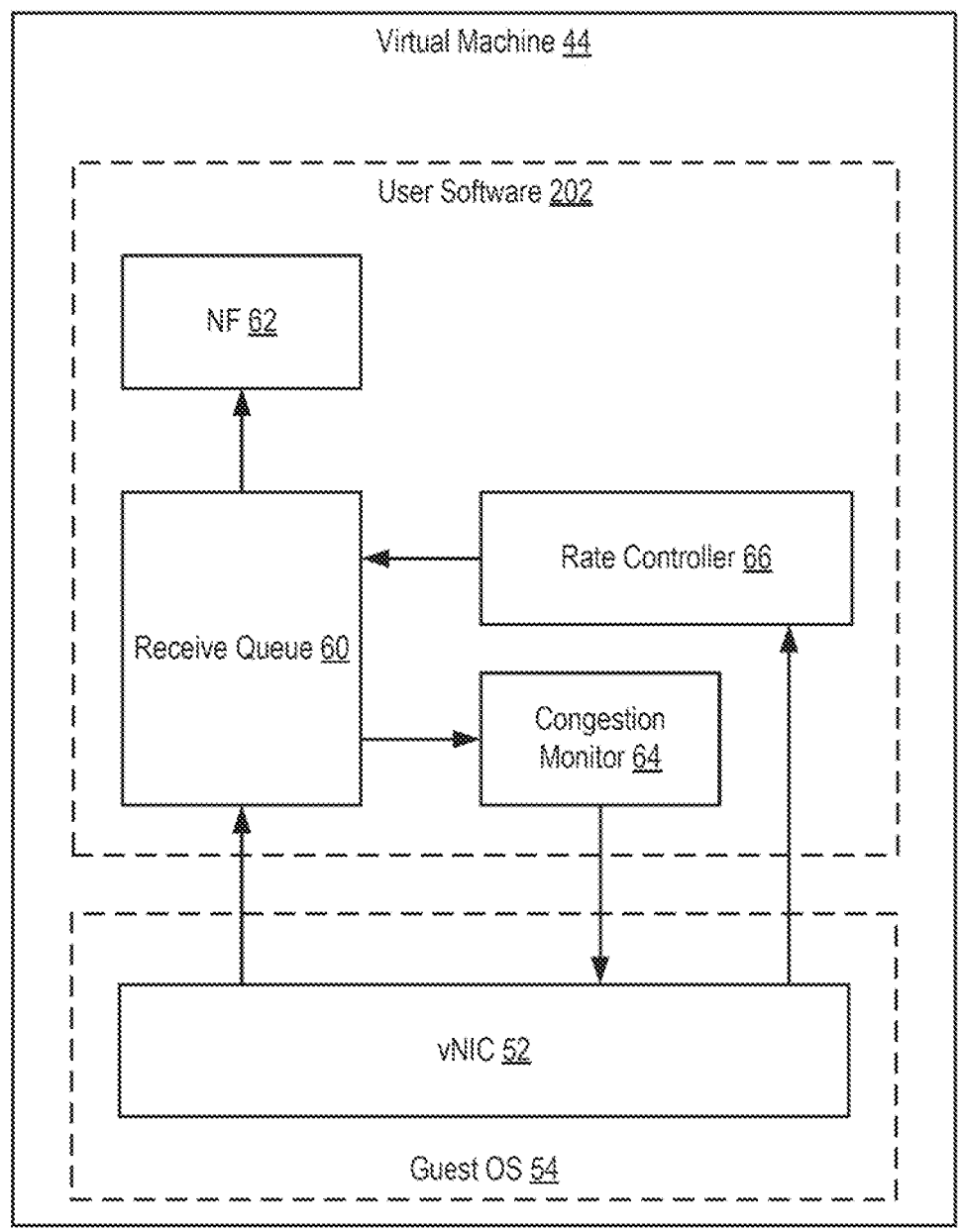
FIGS. 2A-2B are block diagrams depicting network function deployments according to embodiments.

FIG. 2A is a block diagram depicting a network function deployment 200 according to embodiments. In the embodiment, user software 202 executes in a VM 44 managed by a guest OS 54. Guest OS 54 includes a vNIC 52 and user software 202 receives packets from, and sends packets to, vNIC 52.

An NF 62 in NFC 72 receives packets to process from receive queue 60. NF 62 executes during a slice of time on a processing unit (e.g., GPU) as controlled by a processing unit scheduler (e.g., virtual GPU scheduler). Receive queue 60 receives packets from vNIC 52 and queues them for processing by NF 62. Congestion monitor 64 monitors occupancy of receive queue 60 (e.g., the amount of receive queue consumed by packets to be processed). Congestion monitor 64 is configured with a queue threshold. Congestion monitor 64 compares the occupancy of receive queue 60 against the queue threshold. Congestion monitor 64 can perform the comparison periodically. When the occupancy of receive queue 60 exceeds the queue threshold, congestion monitor 64 generates a notification for a rate controller 66 of the upstream NF (the upstream NF provides packets receive queue 60). The notification instructs the rate controller of the upstream NF to apply rate limiting to the upstream NF. When the occupancy of receive queue 60 falls below the queue threshold, congestion monitor 64 generates another notification for the rate controller of the upstream NF. The other notification instructs the rate controller of the upstream NF to remove the rate limiting of the upstream NF. By temporarily limiting the packet processing rate of the upstream NF, NF 62 can process the packets in receive queue 60 while the number of incoming packets to receive queue 60 is limited. In embodiments, the rate limit comprises suspension of packet processing so that the upstream NF does not process any packets from its receive queue and does not provide any packets to receive queue 60 of NF 62.

Rate controller 66 controls the rate of packets provided to NF 62. In response to a rate limiting notification from the congestion monitor of a downstream NF, rate controller 66 applies rate limiting to receive queue 60, limiting the rate of packets provided to NF 62. In embodiments, the rate limiting comprises suspension of packets provided to NF 62. In response to a resume notification from the congestion monitor of a downstream NF, rate controller 66 a removes the rate limiting from receive queue 60, allowing packets to flow to NF 62 at the normal rate. Rate controller 66 receives notifications from the congestion monitor of the downstream NF through vNIC 52.

Figure 2B:
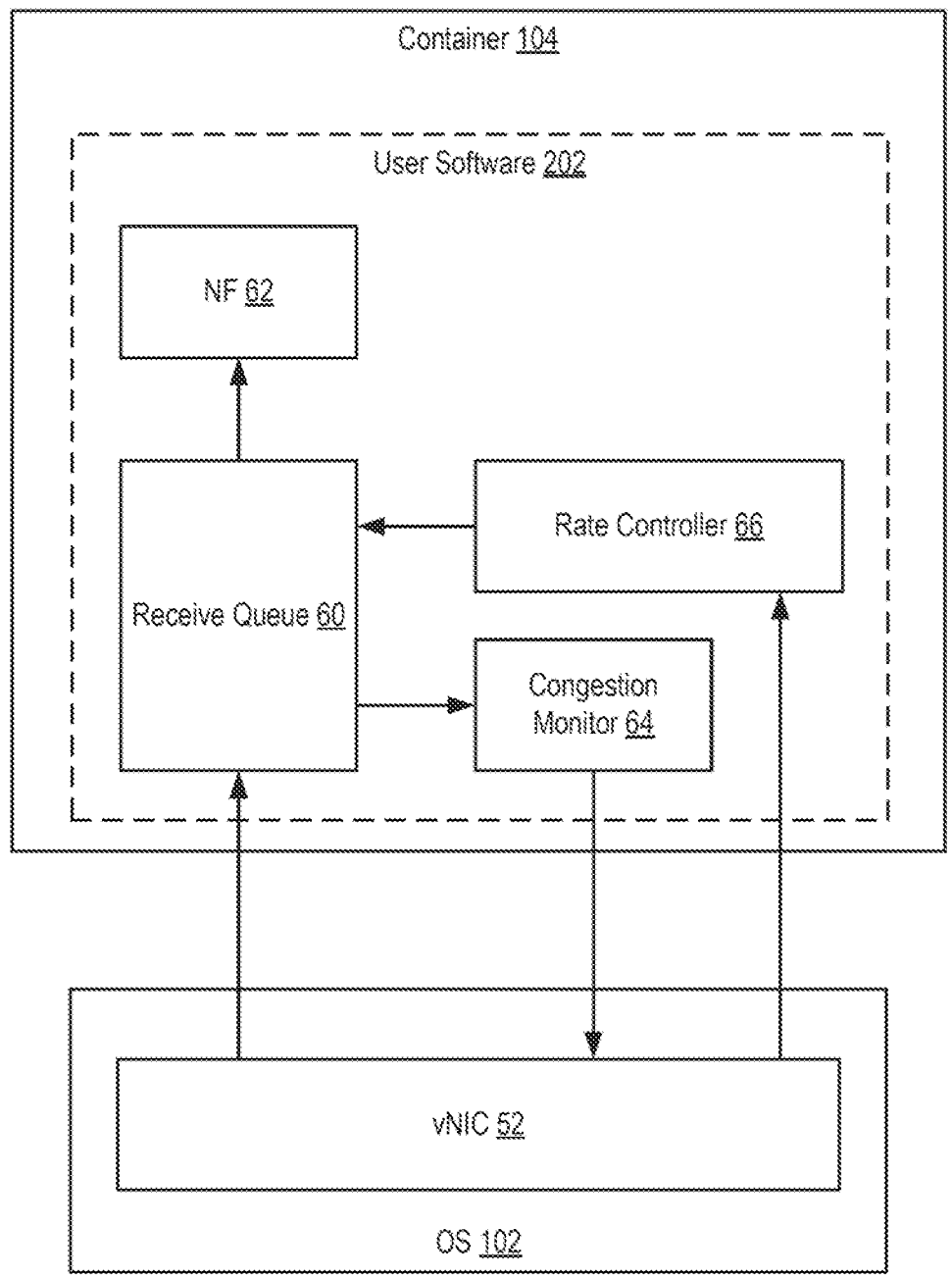

FIG. 2B is a block diagram depicting a network function deployment 201 according to embodiments. In the embodiment, user software 202 executes in a container 104. Container 104 executes on top of OS 102, which includes vNIC 52. User software 202 receives packets from, and sends packets to, vNIC 52. The components of user software 202 function as described above in FIG. 2A. In other embodiments, container 104 having user software 202 can execute on a guest OS in a VM. In general, user software 202 executes in a virtual computing instance. The virtual computing instance can be a VM, a container executing on a host OS, or a container in a VM executing on a guest OS. In embodiments, container 104 can be managed by a container orchestrator, such as KUBERNETES. In such case, container 104 can execute in a pod managed by the container orchestrator, where the pod executes on a host OS or a guest OS of a VM. In such case, the pod comprises a virtual computing instance. In embodiments, user software 202 executes in a single container 104 of a pod. In other embodiments, the components of user software 202 can execute in multiple containers of a single pod. For example, NF 62 may reside in one container and receive queue 60, rate controller 66, and congestion monitor 64 may reside in one or more sidecar containers.

Figure 3:
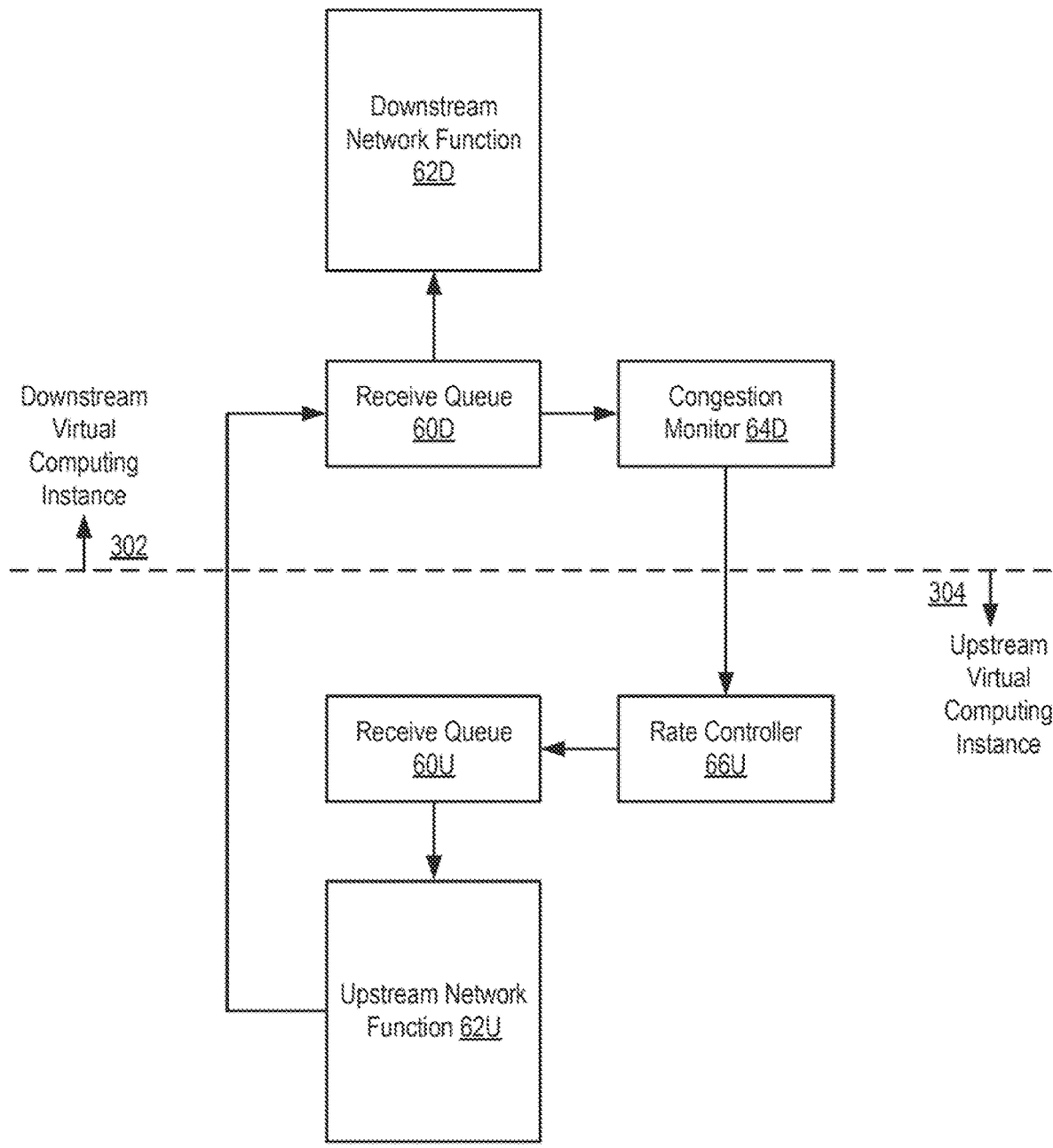
FIG. 3 is a block diagram depicting upstream and downstream NFs in an NFC according to embodiments.

FIG. 3 is a block diagram depicting upstream and downstream NFs in an NFC according to embodiments. A downstream NF 62D executes in a virtual computing instance 302. Downstream NF 62D executes in a time slice on a processing unit (e.g., GPU) as determined by a processing unit scheduler (e.g., GPU scheduler). Receive queue 60D and congestion monitor 64D execute in virtual computing instance 302 on a virtual CPU.

An upstream network function 62U executes in a virtual computing instance 304. Upstream NF 62U executes in another time slice on the processing unit (e.g., GPU) as determined by the processing unit scheduler (e.g., GPU scheduler). Receive queue 60U and rate controller 66U execute in virtual computing instance 304 on a virtual CPU. Upstream network function 62U processes packets from receive queue 60U and sends the processed packets to receive queue 60D for further processing by downstream network function 62D.

Congestion monitor 64D monitors occupancy of receive queue 60D and compares the occupancy against a queue threshold. If the occupancy exceeds the queue threshold, congestion monitor 64D generates a rate limiting notification. Congestion monitor 64D sends the rate limiting notification to rate controller 66U. Rate controller 66U receives the rate limiting notification and limits the rate of packets flowing to upstream network function 62U from receive queue 66U. In embodiments, the rate limiting comprises suspension of the flow of packets from receive queue 60U to upstream network function 62U. In such case, upstream network function 62U processes less or no packets from receive queue 60U and thus provides less or no packets to receive queue 60D.

When the occupancy of receive queue 60D falls below the queue threshold, congestion monitory 64D generates a resume notification. Congestion monitor 64D sends the resume notification to rate controller 66U. Rate controller 66U receives the resume notification and sets the rate of packets flowing from receive queue 60U to upstream network function 62U to be the normal rate (without rate limiting). In embodiments, congestion monitor 64D can include some hysteresis when generating rate limiting and resume notifications based on the comparison of the receive queue occupancy and the threshold. This can prevent constant switching between rate limiting and normal modes for upstream NF 62U.

Figure 4:
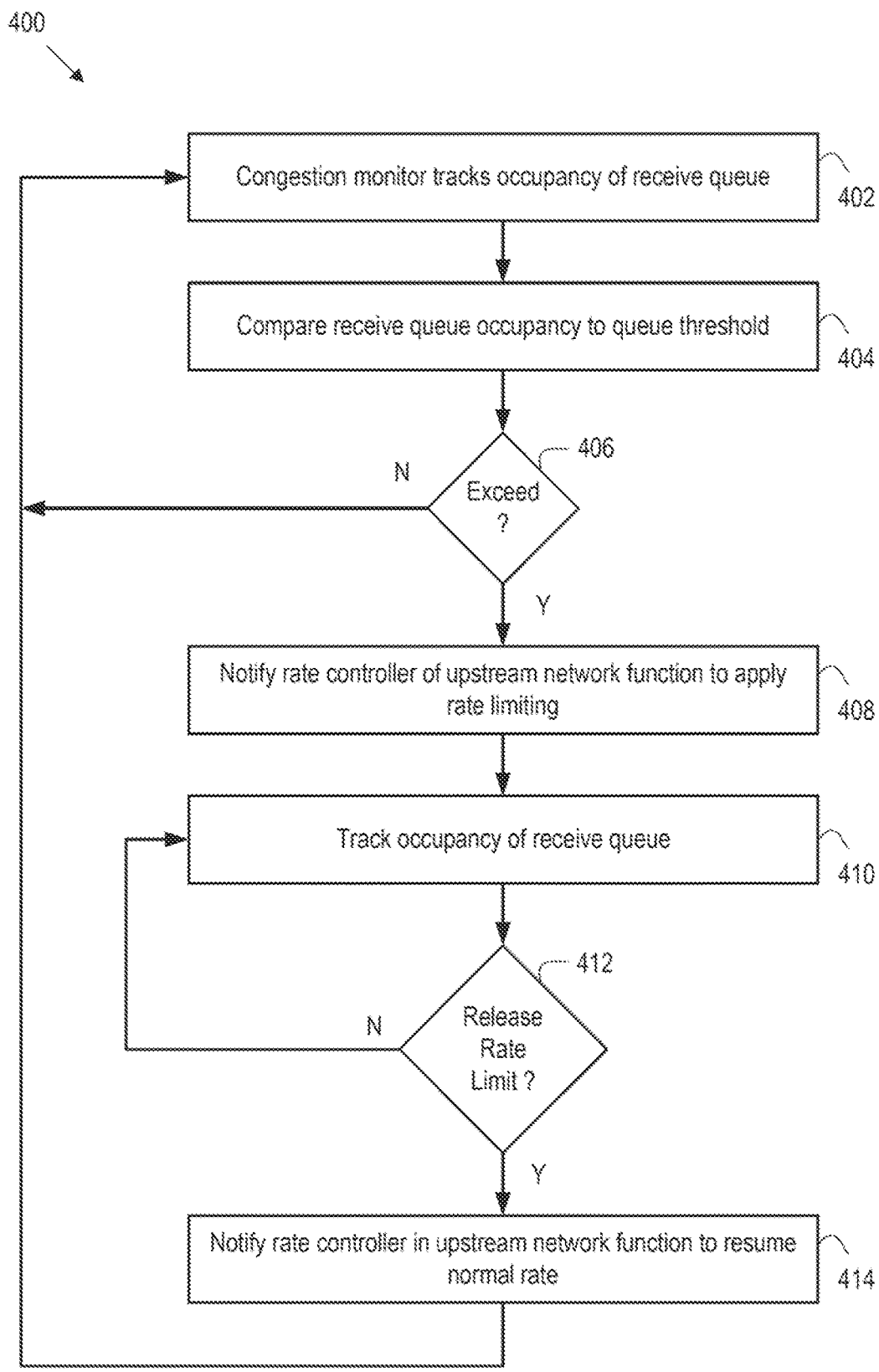
FIG. 4 is a flow diagram depicting a method of monitoring a receive queue for a network function according to embodiments.

FIG. 4 is a flow diagram depicting a method 400 of monitoring a receive queue for a network function according to embodiments. Method 400 begins at step 402, where a congestion monitor tracks the occupancy of a receive queue (e.g., the percentage of the receive queue consumed by packets to be processed by the NF). At step 404, the congestion monitor compares the receive queue occupancy with the queue threshold. If at step 406 the receive queue occupancy exceeds the queue threshold, method 400 proceeds to step 408. Otherwise, method 400 returns to step 402.

At step 408, the congestion monitor notifies the rate controller of the upstream NF to apply rate limiting. At step 410, congestion monitor tracks the occupancy of the receive queue. Since the upstream NF implements rate control, the amount of packets received by the receive queue is reduced (or in case of suspension, no packets are received). As the NF processes packets in the receive queue, the occupancy falls. The congestion monitor determines if the rate limiting should be released from the upstream NF (step 412). For example, the congestion monitor determine rate limiting should be released when the occupancy falls below the queue threshold (with or without hysteresis). If rate limiting should be removed, method 400 proceeds to step 414. Otherwise, method 400 returns to step 410. At step 414, the congestion monitor notifies the rate controller in the upstream NF to resume the normal rate of packet flow between its receive queue and the upstream NF.

Figure 5:
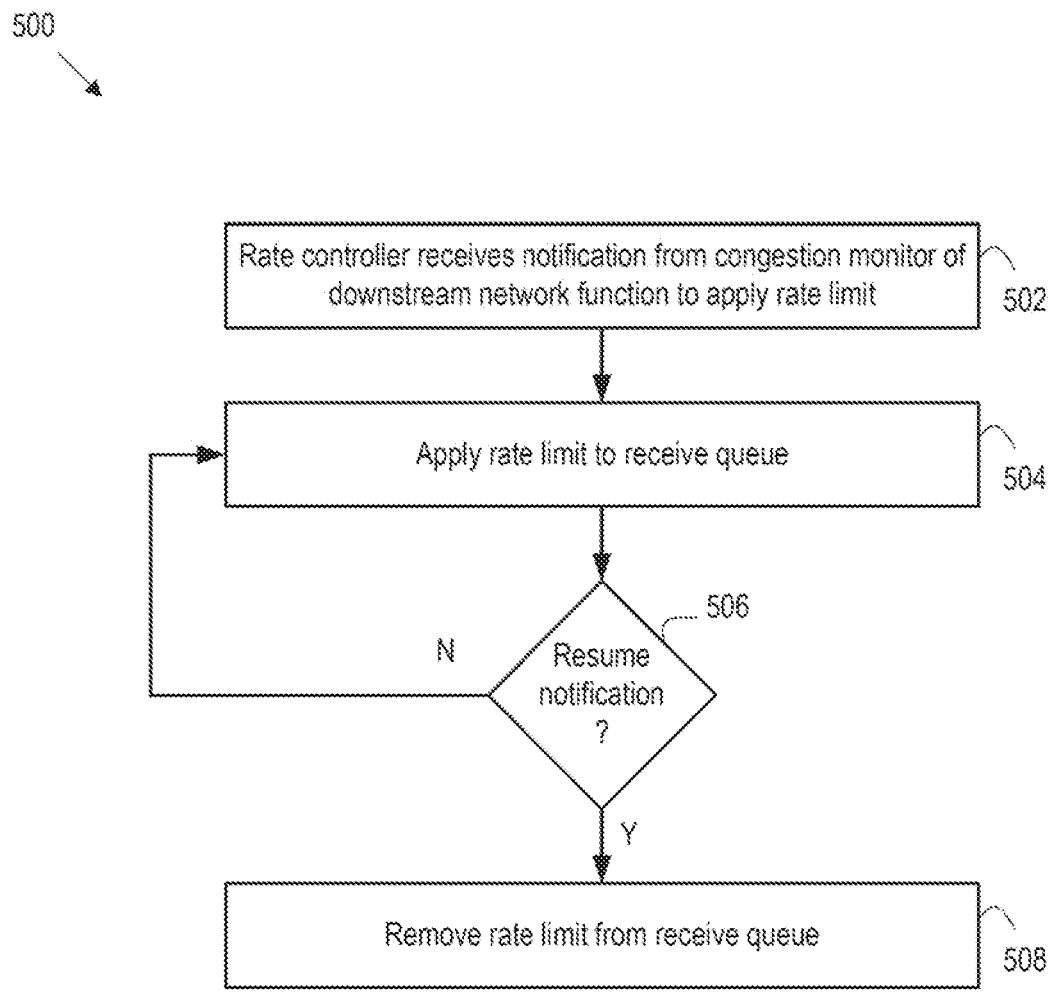
FIG. 5 is a flow diagram depicting a method 500 of controlling the rate of packet flow between a receive queue and an NF according to embodiments.

FIG. 5 is a flow diagram depicting a method 500 of controlling the rate of packet flow between a receive queue and an NF according to embodiments. Method 500 begins at step 502, where the rate controller receives a rate limiting notification from the congestion monitor of a downstream NF. At step 504, the rate controller applies a rate limit to the receive queue of the NF. This limits the flow of packets from the receive queue to the NF. In embodiments, the rate limit comprises suspension of the packet flow between the receive queue and the NF. At step 506, the rate controller determines if a resume notification has been received. If not, method 500 returns to step 504 and the rate limit remains applied. If a resume notification is received from the downstream congestion monitor, method 500 proceeds to step 508. At step 508, the rate controller removes the rate limit applied to the receive queue. Packets flow from the receive queue to the NF at the normal rate.

Virtual processing unit scheduling in a computing system has been described. Ideally, the processing unit share allocated to each NF should be proportional to the compute, memory, and network requirements of the NF. The challenges in implementing the rate proportional scheduling of the virtual processing units are two folds. First, there is a lack of preemption support in virtualization-aware hardware. Second, the virtualization-aware hardware and associated software (drivers) are proprietary, so one cannot design a custom scheduling solution. The techniques described herein provide NFC management software 70 that can be used to control packet flow rates in NFs that are upstream of bottleneck NFs. In a network function chain, if one of the network functions has a slow processing rate (bottleneck NF), it affects the overall throughput of the chain. Also, absent the NFC management software described herein, the slow downstream NFs drop the packet which the upstream NF already processed. This action of dropping the partially processed packet wastes the work done by the upstream NF and, at the same time, it results in lower throughput. Temporarily restricting the packet rate in NFs upstream of a bottleneck NF reduces the load on the bottleneck NF, results in less or no packet drops, and increases throughput.

While some processes and methods having various operations have been described, one or more embodiments also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

One or more embodiments of the present invention may be implemented as one or more computer programs or as one or more computer program modules embodied in computer readable media. The terms computer readable medium or non-transitory computer readable medium refer to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Certain embodiments as described above involve a hardware abstraction layer on top of a host computer. The hardware abstraction layer allows multiple contexts to share the hardware resource. These contexts can be isolated from each other, each having at least a user application running therein. The hardware abstraction layer thus provides benefits of resource isolation and allocation among the contexts. Virtual machines may be used as an example for the contexts and hypervisors may be used as an example for the hardware abstraction layer. In general, each virtual machine includes a guest operating system in which at least one application runs. It should be noted that, unless otherwise stated, one or more of these embodiments may also apply to other examples of contexts, such as containers. Containers implement operating system-level virtualization, wherein an abstraction layer is provided on top of a kernel of an operating system on a host computer or a kernel of a guest operating system of a VM. The abstraction layer supports multiple containers each including an application and its dependencies. Each container runs as an isolated process in user-space on the underlying operating system and shares the kernel with other containers. The container relies on the kernel's functionality to make use of resource isolation (CPU, memory, block I/O, network, etc.) and separate namespaces and to completely isolate the application's view of the operating environments. By using containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Boundaries between components, operations, and data stores are somewhat arbitrary, and particular operations are illustrated in the context of specific configurations. Other allocations of functionality are envisioned and may fall within the scope of the appended claims. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A computer system, comprising:
a hardware platform including a processing unit;
software, executing on the hardware platform, including a workload and a scheduler, the workload executing as user software in a virtual computing instance and including a network function chain having network functions, the scheduler configured to schedule the network functions for execution on the processing unit in equal time slots;
a downstream network function of the network functions including a congestion monitor, the congestion monitor configured to monitor a first receive queue supplying packets to the downstream network function, the congestion monitor configured to compare occupancy of the first receive queue against a queue threshold, the scheduler configured to schedule the downstream network function for execution on the processing unit in a first time slot; and
an upstream network function of the network functions, different than the downstream network function, including a rate controller, the upstream network function supplying packets to the first receive queue, the scheduler configured to schedule the upstream network function for execution on the processing unit in a second time slot of equal time to the first time slot, the rate controller configured to receive a notification from the congestion monitor generated in response to the occupancy of the first receive queue exceeding the queue threshold, the rate controller configured to modify a rate of packet flow between a second receive queue and the upstream network function in response to the notification;
wherein the rate controller is configured to modify the rate of the packet flow by suspending the packet flow between the second receive queue and the upstream network function in response to the notification; and
wherein the rate controller is configured to receive a second notification from the congestion monitor and resume the packet flow between the second receive queue and the upstream network function in response to the second notification.

2. The computer system of claim 1, wherein the hardware platform includes a central processing unit (CPU) and wherein the processing unit is a peripheral to the CPU.

3. The computer system of claim 2, wherein the processing unit comprises a graphics processing unit (GPU).

4. The computer system of claim 1, wherein the scheduler does not expose preemption control to the workload.

5. The computer system of claim 1, wherein the scheduler comprises a best-effort scheduler, a round-robin scheduler, or a fixed-duration scheduler.

6. The computer system of claim 1, wherein the software comprises a hypervisor that includes the scheduler, and wherein the workload executes in virtual computing instances managed by the hypervisor.

7. The computer system of claim 6, wherein the virtual computing instances comprise virtual machines (VMs), wherein the hypervisor is configured to virtualize the processing unit and provide virtual processing units to the VMs, and wherein the network functions execute in the VMs on the virtual processing units.

8. A method of managing network functions of a network function chain scheduled to execute on a processing unit in a hardware platform of a computing system in equal time slots by a scheduler, the method comprising:
   executing a downstream network function, a congestion monitor, and a first receive queue as user software in a first virtual computing instance, the scheduler configured to schedule the downstream function for execution on the processing unit in a first time slot;
   executing an upstream network function, a second receive queue, and a rate controller as user software in a second virtual computing instance, the upstream network function different than the downstream network function, the scheduler configured to schedule the upstream network function on the processing unit in a second time slot of equal time to the first time slot;
   monitoring, by the congestion monitor, congestion of the first receive queue supplying packets to the downstream network function of the network functions;
   comparing, by the congestion monitor, occupancy of the first receive queue to a queue threshold;
   receiving, at the rate controller, a notification from the congestion monitor generated in response to the occupancy of the first receive queue exceeding the queue threshold;
   modifying, by the rate controller, a rate of packet flow between the second receive queue and the upstream network function in response to the notification, the upstream network function supplying packets to the first receive queue, wherein the rate controller modifies the rate of the packet flow by suspending the packet flow between the second receive queue and the upstream network function in response to the notification;
   receiving, at the rate controller, a second notification from the congestion monitor; and
   resuming, by the rate controller, the packet flow between the second receive queue and the upstream network function in response to the second notification.

9. The method of claim 8, wherein the processing unit comprises a graphics processing unit (GPU).

10. The method of claim 8, wherein the scheduler does not expose preemption control to the network functions.

11. The method of claim 8, wherein the software comprises a hypervisor that includes the scheduler, and wherein the first and second virtual computing instances comprise virtual machines (VMs) managed by the hypervisor.

12. The method of claim 11, wherein the hypervisor is configured to virtualize the processing unit and provide virtual processing units to the VMs, and wherein the network functions execute in the VMs on the virtual processing units.

13. A non-transitory computer readable medium comprising instructions to be executed in a computing device to cause the computing device to carry out a method of managing network functions of a network function chain scheduled to execute on a processing unit in a hardware platform of a computing system in equal time slots by a scheduler, the method comprising:
   executing a downstream network function, a congestion monitor, and a first receive queue as user software in a first virtual computing instance, the scheduler configured to schedule the downstream function for execution on the processing unit in a first time slot;
   executing an upstream network function, a second receive queue, and a rate controller as user software in a second virtual computing instance, the upstream network function different than the downstream network function, the scheduler configured to schedule the upstream network function on the processing unit in a second time slot of equal time to the first time slot;
   monitoring, by the congestion monitor, congestion of the first receive queue supplying packets to the downstream network function of the network functions;
   comparing, by the congestion monitor, occupancy of the first receive queue to a queue threshold;
   receiving, at the rate controller, a notification from the congestion monitor generated in response to the occupancy of the first receive queue exceeding the queue threshold;
   modifying, by the rate controller, a rate of packet flow between the second receive queue and the upstream network function in response to the notification, the upstream network function supplying packets to the first receive queue, wherein the rate controller modifies the rate of the packet flow by suspending the packet flow between the second receive queue and the upstream network function in response to the notification;
   receiving, at the rate controller, a second notification from the congestion monitor; and
   resuming, by the rate controller, the packet flow between the second receive queue and the upstream network function in response to the second notification.

14. The non-transitory computer readable medium of claim 13, wherein the processing unit comprises a graphics processing unit (GPU).

15. The non-transitory computer readable medium of claim 13, wherein the software comprises a hypervisor that includes the scheduler, and wherein the first and second virtual computing instances comprise virtual machines (VMs) managed by the hypervisor.

16. The non-transitory computer readable medium of claim 15, wherein the hypervisor is configured to virtualize the processing unit and provide virtual processing units to the VMs, and wherein the network functions execute in the VMs on the virtual processing units.

* * * * *